(12) United States Patent
Vörös et al.

(10) Patent No.: US 12,498,309 B2
(45) Date of Patent: Dec. 16, 2025

(54) IN-SITU CONTROLLED DISSOLUTION OF METALS USING ELECTROCHEMISTRY

(71) Applicant: ETH Zurich, Zurich (CH)

(72) Inventors: Janos Vörös, Zurich (CH); Alexander Tanno, Thalwil (CH); Raphael Tiefenauer, Zürich (CH); Yves Blickenstorfer, Thalwil (CH)

(73) Assignee: ETH ZURICH, Zurich (CH)

( * ) Notice: Subject to any disclaimer, the term of this patent is extended or adjusted under 35 U.S.C. 154(b) by 325 days.

(21) Appl. No.: 18/042,826

(22) PCT Filed: Aug. 27, 2021

(86) PCT No.: PCT/EP2021/073701
§ 371 (c)(1),
(2) Date: Feb. 24, 2023

(87) PCT Pub. No.: WO2022/043477
PCT Pub. Date: Mar. 3, 2022

(65) Prior Publication Data
US 2023/0324274 A1 Oct. 12, 2023

(30) Foreign Application Priority Data
Aug. 28, 2020 (EP) .................................... 20193267

(51) Int. Cl.
*G01N 15/02* (2024.01)
*G01N 15/01* (2024.01)
*G01N 15/06* (2024.01)

(52) U.S. Cl.
CPC ..... *G01N 15/0266* (2013.01); *G01N 15/0656* (2013.01); *G01N 15/01* (2024.01)

(58) Field of Classification Search
CPC . G01N 15/0266; G01N 15/0656; G01N 15/01
USPC ........................................................ 324/71.4
See application file for complete search history.

(56) References Cited

U.S. PATENT DOCUMENTS

| | | | |
|---|---|---|---|
| 4,557,759 A | 12/1985 | McGrew et al. | |
| 2006/0228814 A1 | 10/2006 | Limoges et al. | |
| 2011/0171749 A1 | 7/2011 | Alocilja et al. | |
| 2012/0244630 A1* | 9/2012 | Svendsen ........... | G01N 33/5438 422/69 |
| 2015/0064693 A1* | 3/2015 | Khattak ........... | G01N 35/00029 435/5 |
| 2016/0139078 A1* | 5/2016 | Henry .................. | C12N 15/101 204/645 |
| 2018/0011054 A1 | 1/2018 | Hori et al. | |
| 2022/0091014 A1* | 3/2022 | Swami ................... | B03C 5/005 |

(Continued)

FOREIGN PATENT DOCUMENTS

| | | |
|---|---|---|
| EP | 2 458 383 A1 | 5/2012 |
| JP | 2013-142664 A | 7/2013 |

(Continued)

OTHER PUBLICATIONS

English translation of Japanese Office Action dated Jun. 24, 2025, Application No. 2023-511797; 4 pages.

*Primary Examiner* — Raul J Rios Russo
(74) *Attorney, Agent, or Firm* — Rankin, Hill & Clark LLP

(57) ABSTRACT

Methods and devices for electrochemically controlled degradation of metals particles using halide biochemistry allowing in-situ control and being suitable for analyte detection and quantification.

16 Claims, 12 Drawing Sheets

(56) References Cited

U.S. PATENT DOCUMENTS

2022/0091114 A1* 3/2022 Levin ................ G01S 19/01
2024/0361226 A1* 10/2024 Swami ............. G01N 15/1031

FOREIGN PATENT DOCUMENTS

| JP | 2016-133465 A | 7/2016 |
| JP | 2020-079765 A | 5/2020 |
| WO | 2015/102937 A1 | 7/2015 |

* cited by examiner

A

B

IN-SITU CONTROLLED DISSOLUTION OF METALS USING ELECTROCHEMISTRY

BACKGROUND OF THE INVENTION

Field of the Invention

The invention is in the field of dissolution of metals suitable for biosensing applications. The invention refers to devices and methods to dissolve metallic particles using halide biochemistry allowing in-situ control and being suitable for analyte detection and quantification.

Description of Related Art

The invention includes a new way to degrade metals with an electrochemically controlled reaction without directly connecting it to an electrical circuit. Traditional ways to degrade metals include the degradation in solution by directly applying a potential/current and thus directly driving an electrochemical dissolution reaction. Alternatively, metals can be degraded by adding an etching solution like acids or $KI/I_2$ solutions. The present invention enables the degradation of metals that are not directly connected or connectable by an electric potential and without adding an etching solution directly. Instead the metals are degraded by locally generating active etching molecules from inactive and therefore non-etching precursor molecules. This approach allows an electrically controlled etching (controlled etching start, etching stop and etching rate) of metals that are not or cannot be directly electrically connected. For example, metal particles that are immobilized on a non-conductive substrate or metal particles that are free floating in solution. The herein described technology thus allows to dissolve such metal particles without the need of a rinsing step or toxic substances. Furthermore, the technology facilitates the detection of analytes in bioassays.

SUMMARY OF THE INVENTION

It is accordingly an object of the present invention to provide a method for the electrochemically controlled degradation of metals including the following steps:
A) Providing a piece of a metal or a metal particle free floating or adsorbed on or in a substrate
B) Contacting the metal with a solution containing an inactive precursor
C) Applying an electrochemical potential to the solution containing the inactive precursor and thereby generating a solution that degrades the metal.

The invention includes a method or device that is used to degrade a metal or metal particles. The term "piece of a metal or a metal particle" refers to each piece of a metal or metal alloy. The present invention is suitable for degradation of metals, metal salts or metal alloys. Preferred metals may be selected from the group of: gold, iron or iron oxide, silver, platinum, cadmium, tellurium, lead, indium, zinc, copper, aluminum, germanium, niobium, strontium, vanadium, titanium, chromium, mercury, gallium, and palladium. The metal salts are preferably oxides, sulfides or nitrates of metals and may be selected from the group consisting of iron oxide, silicon oxide, zinc oxide, iron sulfite, gold(III) oxide ($Au_2O_3$), zinc sulfide, and zinc cadmium sulfide.

Suitable metal particles are colloidal gold nanoparticles, europium nanoparticles, magnetic particles such as $Fe_3O_4$ particles or maghemite (Fe2O3, γ-Fe2O3) particles, selenium nanoparticles, silver nanoparticles, platinum nanoparticles, palladium nanoparticles, copper nanoparticles, molybdenum nanoparticles, tungsten nanoparticles, titanium nanoparticles, aluminum nanoparticles, zinc oxide nanoparticles, zinc sulfide nanoparticles, cadmium sulfide nanoparticles, lead sulfide nanoparticles, and gallium arsenide nanoparticles. Preferred are metal particles that can be used as a label in bioassays. In one embodiment the metal particles are colloidal particles. Therefore, it should be detectable at very low concentrations and it should retain its properties upon conjugation with biorecognition molecules. Most preferred are gold nanoparticles and silver nanoparticles.

In step B) of the present application the metal is contacted by a solution that contains an inactive precursor. These solutions are not degrading the metal, so the initial etching speed is zero. The inactive precursor may be a molecule being not able to degrade or etch a metal which may be converted (transformed) into an active substance or molecule being able to degrade or etch a metal. The inactive precursor is preferably a halide ion. A halide ion is a halogen atom bearing a negative charge. The halide ion may be selected from the group consisting of iodide ($I^-$), fluoride ($F^-$), chloride ($Cl^-$), bromide ($Br^-$) and astatide ($At^-$). The solution may also contain a mixture of two or more different halide ions. The preferred halide ion is iodide. The halide ions, and especially iodide, are typically added by dissolving a halide salt in the solution. Preferred salts are iodide salts. The iodide salt may be selected from the group comprising: KI, NaI, LiI, HI, RbI, CsI, CuI, AgI, AuI, AtI, IBr, ICl, or TiI.

The inactive precursor may be present or used in an amount sufficient to degrade the total amount of metal used. A suitable concentration depends on different features such as volume, size of the electrodes, and amount of metal to be degraded. The amount of the inactive precursor may be in the range of 1 micro M to 1M, preferably 0.1 to 100 mM, preferably from 0.5 to 50 mM and eve more preferred from 1 to 20 mM.

Step B) of the method may be implemented by deposition of dried inactive precursor molecules on a substrate. In another embodiment the inactive precursor may be adsorbed on a separate substrate. In a second sub step, the dried inactive precursor is dissolved. The precursor may be dissolved by pipetting a solvent to the set-up of the method. Suitable solvents are water ($H_2O$) or water-based solutions (such as buffer solutions, salt solutions, acidic, or basic solutions, organic solvent containing solutions, oil containing emulsions, or hydrogels). The inactive precursor may also be solved by a fluidic sample (saliva, blood, urine, tear fluid, sweat, environmental sample, milk, etc.) containing an analyte to be detected. It may be that the added solvent or sample transports the inactive precursor and/or its active products and/or the metal particles to the location where the metal is to be dissolved. Alternatively, a solution containing the inactive precursor may be introduced by pipetting or microfluidic injection. The solution may also be present in a set up and in step B) the pieces of a metal or metal particles are added to the solution.

Step C) of the method according to the invention refers to "Applying an electrochemical potential to the solution containing the inactive precursor and thereby generating a solution that degrades the metal". To apply an electrochemical potential to the solution containing the inactive precursor at least two electrodes are brought in contact with the solution and a sufficient overpotential to the electrodes is applied. This can be done by either attaching or turning on an external electric power source connected to the electrodes or by additionally adding electrochemical reactions creating the necessary over potential. Therefore, one embodiment of the present invention refers to a method, wherein at least two electrodes are used for the application of an electrochemical potential for electrochemical generation of a solution that degrades metals. These electrodes may be a working electrode and a counter electrode.

Preferred are embodiments with further electrodes such as a reference electrode. Preferred are also embodiments where several working electrodes or sets of working and counter electrodes are used. Different working electrodes may be used as degradation electrode (a first working electrode) or detection electrode (a second working electrode). Electrode sets may be arranged to allow a multidetection assay allowing multiplexed detection. Therefore, the device according to the invention may include at least five electrodes, at least two pairs of electrodes for the application of an electrochemical potential for the electrochemical generation of a solution that degrades metals and one electrode being a reference or control electrode. The device may also include multiple (more than 2, preferably more than 10) sets of electrodes, wherein each set includes at least a counter electrode, a reference electrode, a dissolution electrode and a detection electrode. Said set may also include two counter electrodes, two reference electrodes, two dissolution electrodes and one detection electrode.

Thus, the present invention refers to a method wherein the metals are initially not directly electrically connected to an electrochemical circuit. The degradation of the metal is started and controlled by electrochemical generation of active degradation or etching molecules. That means the method allows an electrochemically controlled degradation of metals as an in-situ controlled reaction.

The term "generating a solution that degrades the metal" refers to the conversion of the inactive precursor molecules to molecules within the solution being able to degrade, etch or dissolve the metal (active metal degradation molecules). This conversion or reaction is driven by an electrochemical reaction on the electrode leading to the creation of an active metal dissolution solution.

In the case of iodide as an inactive precursor in the solution, the electrochemical reaction on the electrodes converts iodide into iodine and triiodide to perform the degradation of the metal. This local generation of an active metal degradation solution allows an electrochemically controlled etching of the metal, even if the metal is not directly contacted by an external overpotential. The degradation kinetics can additionally be controlled by the use of different concentrations of the inactive precursor molecule such as iodide (or another halide) in the solution. Additionally, the amount of active metal degrading molecules can be precisely electrochemically controlled, by an externally applied power source. Larger overpotential and overpotentials that are applied for a longer time period are producing larger amounts of active metal degradation molecules leading to the faster degradation of metals (etching speed) and to the degradation of metal further away from the electrode (etching location). Furthermore, the electrode materials can be used as an element of control as the reaction rate can vary orders magnitude for different material. The desired metal degradation parameters in place, kinetics and amount can thus be achieved by using the appropriate concentration of active metal degradation molecules, such as iodide and by applying the appropriate external power function including but not limited to constant potentials or currents, potential or current steps, potential or current ramps, pulsed potential or current or combinations thereof appropriate to the electrode material.

An appropriate anodic potential for a single indium tin oxide working electrode and a Iodide precursor may be of 0.5 to 2 Volts (with respect to a Carbon reference electrode) for 0.1 to 60 Seconds at 1 to 50 mM KI. The process may be controlled more precisely by controlling multiple electrodes at different potential and/or of different materials. This allows to avoid an overproduction of certain chemical products, such as Iodine which could lead to a depletion of the dissolution chemistry, by driving a cathodic reaction at a second electrode. An appropriate combination of two electrodes are Indium Tin Oxide at −1.1 V and carbon at +0.5 V (with respect to a carbon reference electrode) for 10 to 2000 s at 1 to 20 mM KI. In addition, such a setup has the advantage of allowing simultaneous dissolution and deposition of the metal. In some application deposition may be useful for detection of the metal.

The metal degraded by this method or device may subsequently be detected by known metal detection techniques including but not limited to anodic stripping voltammetry, impedance spectroscopy or resistance change upon metal plating on an electrode or on a resistive element of a circuit (e.g. a nanowire).

The described invention can be used for the electrochemical quantification of the amount of metal contained in metal particles. Such results can be used to quantify either the size or the number of metal particles. Applications for the quantification of metal particles using the described invention are molecular sensing methods or devices where the molecules are quantified by coupling to metal particles followed by the quantification of the metal particles using the described method or device.

The described method is especially suitable for detection of an analyte within biosensing applications. It may be used as detection and/or quantification method in assays using biomolecular reporter molecules to detect an analyte. Therefore, the method of the invention may be used in connection with immunoassays such as lateral flow assays (LFA), one-pot assays and general as detection method in microfluidic assays. In general, the method of the present invention may be used for the detection and/or quantification of an analyte in solution. The analyte may be any kind of molecules like peptides, polypeptides, proteins, lipids, polysaccharides, polynucleotides, metabolites, hormones, toxins or drug molecules.

The analyte may be present in any kind of sample. A major part of biosensor applications lies in clinical analysis. It includes detection of a variety of clinical analytes in whole blood, blood serum, saliva, sweat, tears, plasma, urine, cells, tissues and other biological samples. Further suitable samples are: water, fuel, food, drink, and extracts from plants.

To be able to detect and/or quantify an analyte the metal particle can be conjugated directly or indirectly to a molecule able to bind the analyte. The biosensor applications may be based on the principle of sandwich assays (generally used for larger analytes) or competitive assay (generally used for small analytes). The biosensor applications may further be designed as multiplex assays. The biosensor applications may be used to simultaneously detect the presence of multiple analytes in a single experiment. The number of analytes measured within one assay can be >3 and more preferably >10 or even >100.

The steps of a bioassay have to be carried out under conditions suitable to allow binding between the molecules involved. These conditions are known to a person skilled in the art and refer for example to temperature, time, pH value.

One condition is that the molecules involved should not change their structure (e.g. proteins should not denature).

Consequently, one embodiment of the present method includes degradation of metal particles being conjugated to a biomolecule. The biomolecule may be a protein, polypeptide, oligopeptide, an aptamer, a polynucleotide, a polycarbohydrate such as an oligosaccharide, or a lipid. The biomolecule may be any molecule having the ability to recognize and bind a specific analyte. Examples are receptors, ligands, peptides, polypeptides, proteins, polysaccharides, polynucleotides, antibodies, and antibody fragments. Suitable antibody fragments are: a Fab fragment, a Fab' fragment, a F(ab')2 fragment, a Fd fragment, a Fd' fragment, a Fv fragment, a dAb fragment, a scFv (single chain) fragment, an isolated CDR region, a dsFv diabody, a single chain antibody, and combinations thereof. Protocols for labeling metal particles for example protocols based on NETS-ester modification are well known within the field.

For immunoassays it may be suitable that the metal particle and/or the inactive precursor is adsorbed to or in a substrate. It is thereby preferred that the substrate is a non-conductive substrate. The substrate may be a glass plate, a plastic plate such as a multiwell plate (microtiter plate), a micro fluidic channel wall, a porous three-dimensional substrate (e.g. paper, nitrocellulose membrane or glass fiber membrane) or an electrode with a non-conductive coating. The substrate may be capable of liquid transport.

Using the method of the present invention it is possible to quantify an analyte within a sample. To be able to quantify an analyte, one has to quantify the amount of degraded metal. The present invention refers therefore further to embodiments containing an additional step:

D) Detecting and/or Quantifying Electrically or Electrochemically the Degraded Metal.

Detection of the dissolved metal is performed using the same or different electrodes as were used for driving the degradation reaction. Anodic stripping voltammetry, impedance spectroscopy or plating electrode resistance change on an analogous technique are suitable techniques for quantification of the degraded metal.

The step "Quantifying electrically or electrochemically the degraded metal" may include plating the degraded metal (metal ions) to an electrode, such as a plating electrode or a detection electrode, by application of a plating potential and subsequently dissolution of the plated metal. The subsequent dissolution of the plated metal generates an electric current proportional to the amount of plated metal and thus proportional to the amount of analyte present in the sample. Therefore, one embodiment of the present invention refers to a method, wherein step D) includes plating of metal particles caused by degradation due to application of a plating potential to a detection electrode and subsequently determination of the electric current caused by electrochemical dissolution of plated metal particles. The metal plating may be performed during or after the application of the degradation triggering potential.

One aspect of the invention refers to a bioassay including the method of the invention, which could include the following steps:
  A1) Providing a piece of a metal or a metal particle being conjugated to a molecule being specific to the analyte within a solution
  A2) Adding the solution of A1) to a set up where another molecule being specific to the analyte is bound to an electrode and has bound the analyte
  A3) Allowing binding of the metal particle to the analyte
  B) Contacting the metal with a solution containing an inactive precursor
  C) Applying an electrochemical potential to the solution containing the inactive precursor and thereby generating a solution that degrades the metal.
  D) Quantifying electrically or electrochemically the degraded metal.

Another aspect of the invention refers to a bioassay including the method of the invention, which could include the following steps:
  A1) Providing a piece of a metal or a metal particle being conjugated to a molecule being specific to the analyte within a solution
  A2) Adding the solution of A1) to a set up where another molecule being specific to the analyte is bound to an electrode
  A2') Allowing binding of the analyte to the molecule being specific to the analyte and being bound to the electrode
  A3) Allowing binding of the metal particle to the analyte (via the molecule being specific to the analyte and being conjugated to the metal particle)
  B) Contacting the metal with a solution containing an inactive precursor
  C) Applying an electrochemical potential via the electrodes to the solution containing the inactive precursor and thereby generating a solution that degrades the metal.
  D) Quantifying electrically or electrochemically the degraded metal.

The chronological sequence of the above steps may be changed or may take place at the same time.

One aspect of the invention refers to a bioassay including the method of the invention, which could include the following steps:
  A1) Providing a setup that contains a substrate that has at least two electrodes in proximity with a molecule being specific to the analyte being bound to the substrate
  A2) Adding pieces of a metal or metal particles being conjugated to another molecule being specific to the analyte to the setup of A1)
  A3) Adding an inactive etching precursor to the setup
  B1) Adding a solution containing the analyte (e.g. a sample) to the setup of A3)
  B2) Allowing the solution to dissolve the metal particles and the inactive precursor
  B3) Allowing binding of the analyte to the metal particle
  B4) Allowing binding of the analyte to the molecule on the substrate
  B5) Allowing the solution to contact the electrodes of the setup of A3)
  C) Applying an electrochemical potential via the electrodes to the solution containing the inactive precursor and thereby generating a solution that degrades the metal.
  D) Quantifying electrically or electrochemically the degraded metal.

The chronological sequence of the above steps may be changed or may take place simultaneously. In proximity means thereby that the distance between at least one electrode and the molecule being specific to the analyte being bound to the substrate is not more than 10 mm, preferably less than 3 mm and even more preferred less than 1 mm.

Another aspect of the invention refers to a bioassay including the method of the invention, which could include the following steps:

A1) Providing a piece of a metal or a metal particle being conjugated to a molecule being specific to the analyte and being free floating within a solution A2) Adding an analyte (e.g. in a sample) to the solution of A1)

A3) Adding the solution of A2) to a set up where a known amount of analyte is immobilized A3) Allowing binding of the metal particle to the immobilized analyte B) Contacting the metal with a solution containing an inactive precursor C) Applying an electrochemical potential to the solution containing the inactive precursor and thereby generating a solution that degrades the metal.

D) Quantifying electrically or electrochemically the degraded metal.

Another aspect of the invention refers to a bioassay including the method of the invention, which could include the following steps:

A1) Providing a setup that contains a substrate that has at least two electrodes in proximity with a known amount of analyte molecules bound to the substrate being specifically bound to metal particles via a conjugated molecule being specific to the analyte A2) Adding an inactive etching precursor to the setup B1) Adding a solution containing the analyte (e.g. a sample) to the setup of A2)

B2) Allowing the solution to dissolve the inactive precursor

B3) Allowing the replacement of the substrate bound analyte by the free-floating analyte unbinding a fraction of the metal particles from the substrate.

B4) Allowing the solution to contact the electrodes of the setup of A3)

C) Applying an electrochemical potential via the electrodes to the solution containing the inactive precursor and thereby generating a solution that degrades the remaining metal.

D) Quantifying electrically or electrochemically the degraded metal.

The present invention may also include at least one washing step, where unbound analyte molecules and or unbound metal particles are washed away. In addition, it may be suitable to block unspecific binding to different components of the assay such as metal particles. A person known in the art knows or is able to determine when such washing or blocking steps are needed.

A preferred assay to implement a method of the present invention is a lateral flow assay. Lateral flow assays are a subset of assays combining various reagents and process steps in one assay strip, thus providing a sensitive and rapid means for the detection of analytes. In a lateral flow assay, the inactive precursor may be added dried to the conjugation pad or an additional, separate pad.

In a general method, a liquid sample suspected of containing the analyte is applied to a porous carrier which can consist of an arrangement of several components. More specific: it is introduced to a designated area in the sampling-end (also referred as the "proximal end") of the porous carrier, for a measured time, e.g. 5 seconds, or in a measured volume, e.g. 2 drops. Subsequently, the liquid sample migrates within the porous carrier to the direction of the dry end (also referred as the "distal end"). While migrating in the porous carrier, the sample mobilizes metal particles acting as a label that have been reversibly (temporarily) immobilized in the porous carrier. Alternatively, the metal particles can be added together with the sample solution. While analyte is interacting with the conjugated metal particles, the liquid sample and mobilized metal particles migrates further within the porous carrier to the detection zone, where a reagent that binds the same analyte is fixed or immobilized, usually in the form of a line (may also be a dot). When analyte is present in the liquid sample, a "sandwich" in the form of the mobilized metal particle:analyte:immobilized reagent is formed, and the resulting concentration of the metal particle may lead to a visible line appearing in the detection zone, which is indicative of a positive result. Alternatively, the metal particle has first be degraded using the inventive method to be detectable. In each case, the metal particles and therefore the analyte can be quantified using the inventive method for degradation of the metal.

Therefore, the inactive precursor is also dissolved by the sample fluid and transported along to the detection zone. To quantify the adsorbed metal particles, the particles are first dissolved using the inventive method followed by the detection of the dissolved metal molecules by using the same or different electrodes via anodic stripping voltammetry, impedance spectroscopy or electrode resistance change.

After the detection zone there might be a control zone, where another reagent is immobilized. This reagent directly binds to the conjugated particles. It serves as a control if the test was carried out properly. The control can be analyzed optically or with the described inventive method.

A second aspect of the invention refers to devices to carry out a method as described above. Therefore, one embodiment of the invention refers to a device for the electrochemically controlled degradation of metals including at least two electrodes, a piece of a metal or a metal particle free floating or adsorbed on or in a substrate being not directly electrically connected by an electrochemical circuit, and a solution containing an inactive precursor, wherein application of an electrochemical potential to the solution containing the inactive precursor is suitable for generating a solution that degrades the metal.

It is preferred that the inactive precursor is a halide. In addition, all aspects disclosed in connection with the method above should also apply to the device. The device may further include a power supply and conductors to the electrodes. In addition, it is preferred that the device further includes a reference electrode. Thus, one embodiment of the device includes three electrodes. Two electrodes for the application of an electrochemical potential for the electrochemical generation of a solution that degrades metals and one electrode being a reference electrode.

The piece of a metal or the metal particle may be adsorbed on or in a substrate and wherein the substrate is a non-conductive substrate or a conductive substrate with a non-conductive coating. The device may include a housing and/or backing containing the substrate as well as the electrodes. A suggested example for the device is the use of a three-electrode setup with a working, counter and reference electrode. The working electrode may be made of any conductive material or combination of conductive materials like carbon, graphene, carbon nanotubes, gold, silver, sliver-chloride, platinum, boron doped diamond, mercury drop, bismuth or indium tin oxide. The counter electrode may be made of any conductive material or combination of conductive materials like carbon, graphene, carbon nanotubes, gold, silver, sliver-chloride, platinum, boron doped diamond, mercury drop, bismuth or indium tin oxide. The reference electrode may be made of any conductive material or combination of conductive materials like carbon, graphene, carbon nanotubes, gold, silver, sliver-chloride, platinum, boron doped diamond, bismuth, mercury drop or indium tin oxide Another embodiment of the invention refers to a device containing at least one or a first pair of electrodes for detection of the dissolved metal and a second pair of electrodes used for application of an electrochemical potential for the electrochemical generation of a solution that degrades metals. For the purpose of quickly degrading metal particles and accurately measuring the dissolved amount of metal using the described method or device it is not necessary but beneficial to use an electrode setup with more than two electrodes including more than one working electrodes. One (subset of) working electrode(s) may be used for generating the dissolution chemistry, while an-other (subset of) working electrode(s) may be used for the detection of the dissolved metal and may or may not be involved in the generation of the dissolution chemistry.

It is preferred that the device according to the invention is suitable for the quantification of an analyte in solution. Therefore, the device may be designed with a typical setup for bioassays such as a lateral flow assay. The device may be a single assay chamber allowing a so called one-pot-assay.

The most accurate quantification of the dissolved metal may be realized by using micro- or nanosized detection working electrode(s). For the maximization of the signal-to-noise ratio the best results can be obtained by using multiple micro- or nanosized detection working electrodes arranged and connected to maximize the amount of captured degraded metal during the plating and at the same time minimizing occurring background currents.

In an embodiment, the dynamic range can be increased with multiple detection areas configured for a different analyte concentration range. Each area is a reporter for a different agent concentration range, such that the total dynamic range of the assay or device is increased, as it is a combination of the individual concentration ranges. This effect can be achieved by multiple detection areas with constant or varying concentrations of analyte binding molecules. Alternatively, the electrochemical degradation time of the metal particles can be varied for the different areas, from short to long. This can enable a large dynamic range but also support fast test results in the case where the long degradation time is not required. A third approach is to apply different concentrations of the inactive precursor at the different detection areas. This can be achieved by multiplexing in separate isolated channels. Therefore, one embodiment refers to a device of the invention including multiple detection areas, which may be configured differently for example such that the dynamic range of each area is in a different concentration range to increase the combined total dynamic range of the device or to improve the quantification accuracy. It is also possible to quantify several different analytes. Therefore, one embodiment refers to a device of the invention suitable for multiplexed detection of different analytes. Multiplexed measurements can be performed after each other both in time or location or next to each other or stacked on top of each other, or by using different metals or different electrodes.

The invention refers also to a device, that uses at least one reference area. Either a positive or a negative control reference or combinations thereof one by using electrochemical or optical readout methods or one or multiple electrochemical references such as additionally deployed electroactive species.

Another embodiment of the present invention is a kit for the electrochemically controlled degradation of metals comprising:
at least two electrodes,
a metal particle, which may be conjugated to a biomolecule as defined above,
a inactive precursor as defined above which may be in solution.

These kits include may further contain a solution for solving the inactive precursor, a molecule binding the analyte, blocking buffer, control or standard reagents. A kit in molecular biology or in medical diagnostics is a package which includes all necessary ingredients for performing a certain method or singular step. Standard chemicals as present in any standard molecular biology, chemical or medical laboratory are normally not included. Nevertheless, some of these standard chemicals may be indispensable to carry out the inventive assay or the method properly. It is understood that all ingredients are provided in quantities that allow for a proper execution of the desired reactions for the majority of scientific, diagnostic and industrial applications.

Often, but not always, these ingredients are provided in already prepared solutions ready- or close to ready-for-use. There may be also combinations of different ingredients already added together. A further advantage is that such kits use to be verified. Therefore, the operator doesn't have to prove again the viability of the diagnostic method and can save an at least some control experiments. Therefore, kits are a very popular tool in laboratories in research, diagnostics and industry.

BRIEF DESCRIPTION OF THE DRAWINGS

These and further features of the invention are described hereinafter with reference to the drawings, wherein.

DESCRIPTION OF THE PREFERRED EMBODIMENTS

The following more detailed description of the embodiments of the method is a representative of exemplary embodiments of the technology, wherein similar parts are designated by same numerals throughout.

Figure 1:
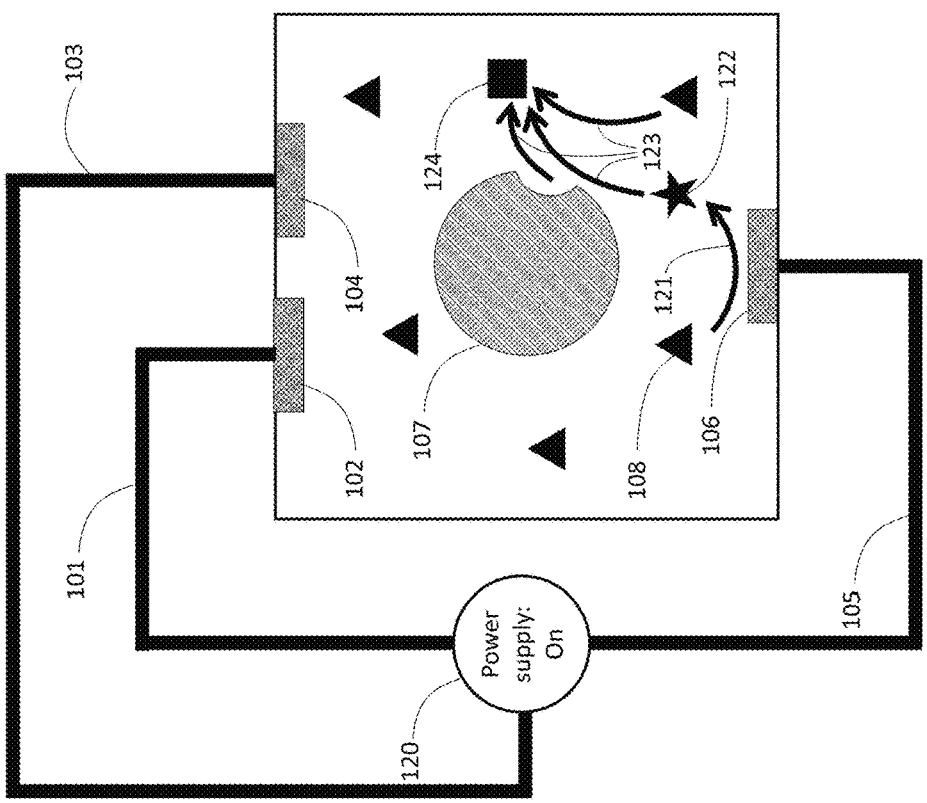
FIGS. 1A-1B show a schematic overview of a method according to the invention and a device for the method.
Figure 1:
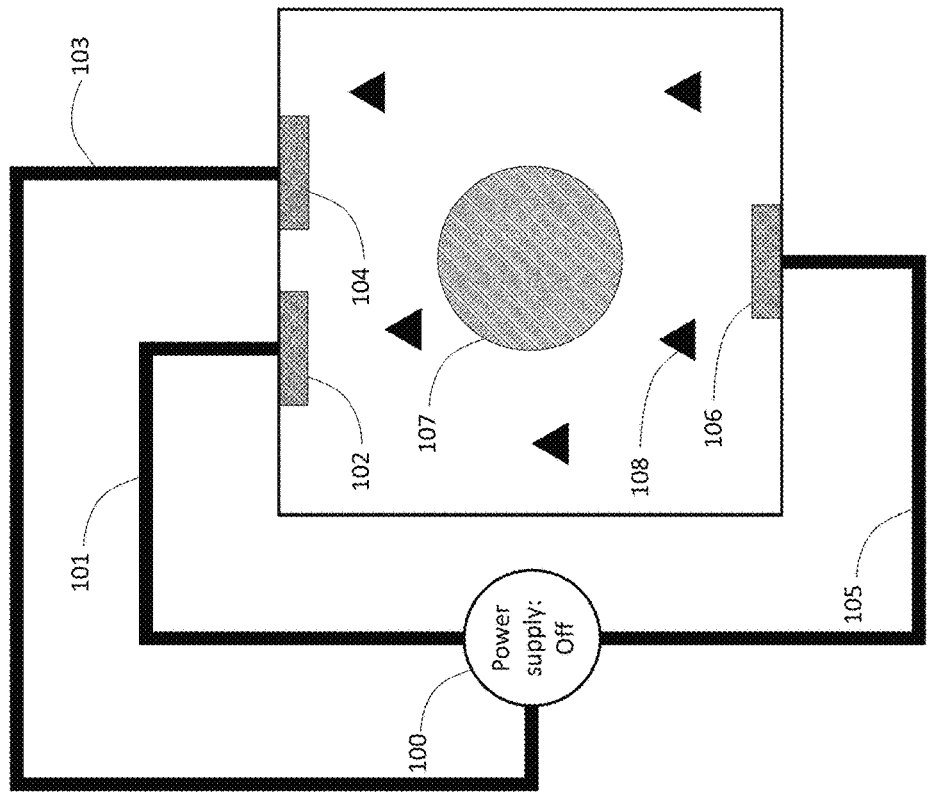

FIGS. 1A-1B show a schematic overview of a method according to the invention and an etching chamber used for the method. Within a chamber three electrodes, a counter electrode 102, a working electrode 106 and a reference electrode 104, are arranged. The setup includes further a power supply 100 and conductors to the electrodes (101, 103, 105). A solution containing I" is filled in the chamber and has contact to the electrodes and at least one metal particle (107 such a s gold). As long as the power supply is off, no etching occurs. Activation of the power supply (FIG. 1 B) leads to the local generation of $I^{3-}$ from $I^-$ (108; or analogous reactions using other halide molecules) and to the efficient etching of the metal particle. In a first reaction 121 elemental Iodine 122 is formed and in a second reaction 123 this elemental iodine reacts with the gold particle, resulting: $AuI_2$ 124. This reaction might also be used to dissolve Ag, Pt or other metal particles. The counter and reference electrodes may be two separate electrodes or fused to one electrode.

Figure 2:
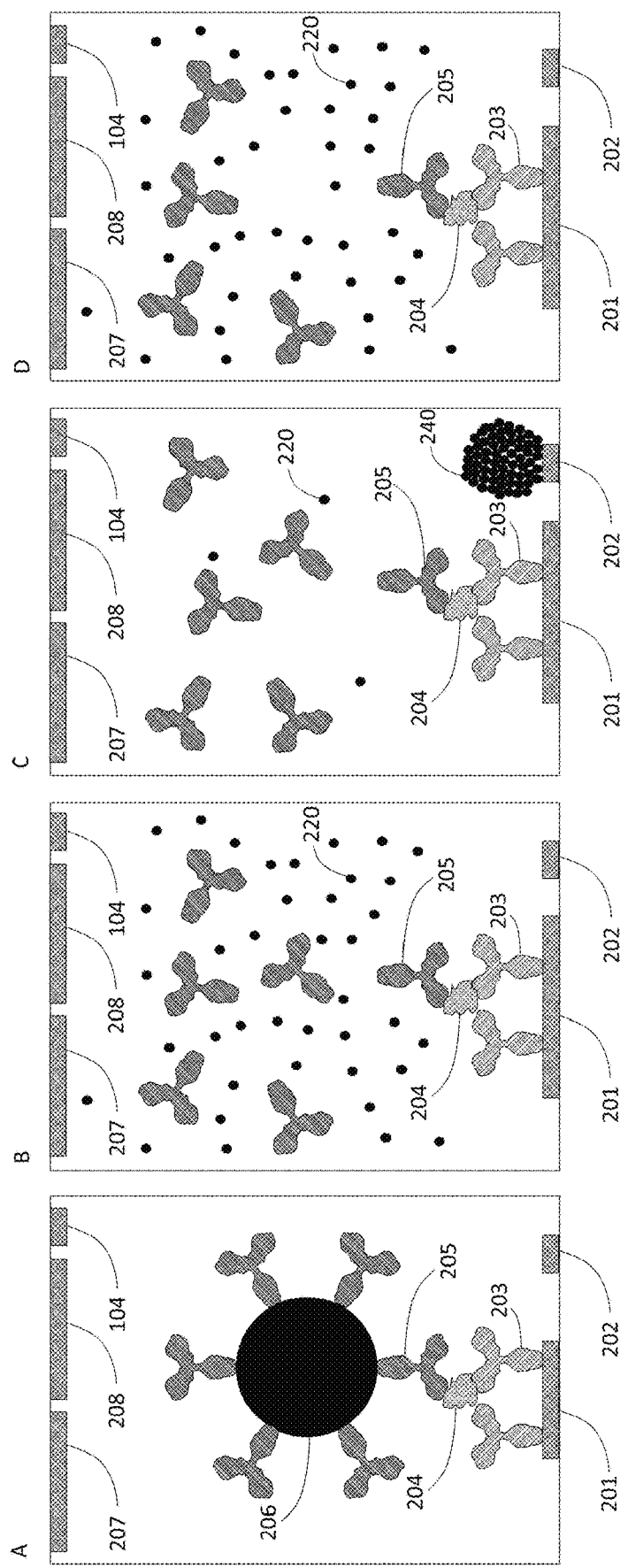
FIGS. 2A-2D show a schematic overview of a method according to the present invention suitable for detection of an analyte and an assay chamber for the detection and quantification of analytes.

FIGS. 2A-2D show a schematic overview of a method according to the present invention suitable for detection of an analyte and an assay chamber for the detection and quantification of analytes. Assay chamber for the detection and quantification of molecules. In FIG. 2A) the assay for the binding of the analyte molecule 204 is completed. The analyte 204 has been bound to the receptor molecule 203 (e.g. capture IgG) and the metal particle 206 has been conjugated to a secondary receptor molecule 205 (e.g. reporter IgG). During the binding assay the secondary receptor molecule 205 as bound to the analyte 204. In FIG. 2 B), the etching reaction is initiated leading to the dissolution of the metal particle 206 into metal ions 220. The etching reaction is carried out when an electrochemical potential is applied using the dissolution electrode 201 and counter electrode 207. The application of a plating potential to the detection electrode 202 (counter electrode 208) leads to the plating of the metal ions on the detection electrode 202 (electro plated metal ions 240). The electrochemical dissolution of the plated metal particles 240 generates an electric current proportional to the amount of plated metal and thus proportional to the amount of analyte molecules 204 present in the sample.

FIGS. 3A-3D show a schematic overview (side view and top view) of a device suitable to perform a method according to the present invention arranged as lateral flow assay suitable for the detection of molecules in liquid samples. FIG. 3A) shows a side view. The sample is deposited on the sample pad 300 and wicks through the pads and filter membrane 303 towards the collection pad 306 and the read-out device 307. The electrodes and the sample carrier strip are separated by an insulator 317.

Figure 3:
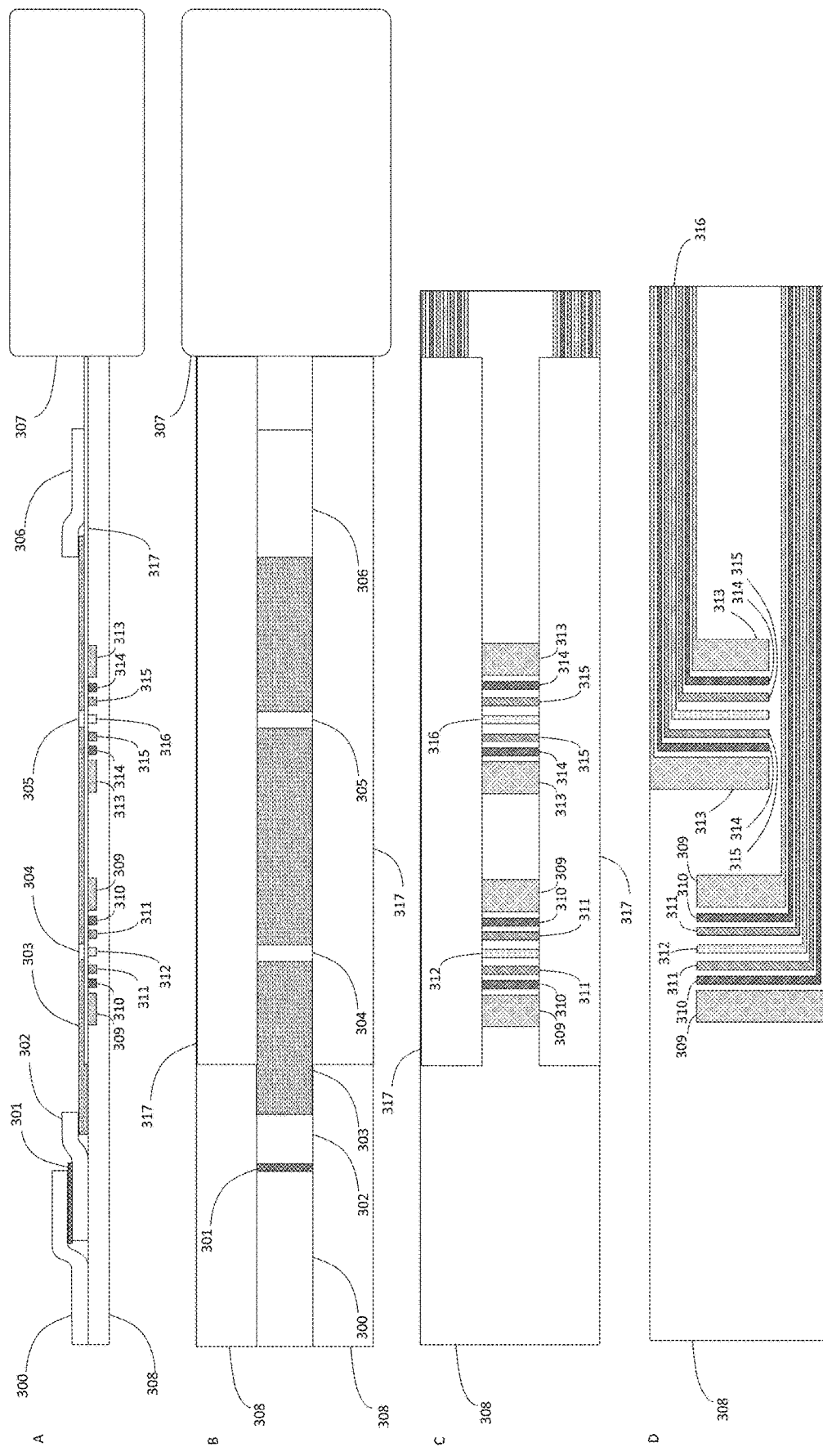
FIGS. 3A-3D show a schematic overview (top view) of a device suitable to perform a method according to the present invention arranged as lateral flow assay.
Figure 4:
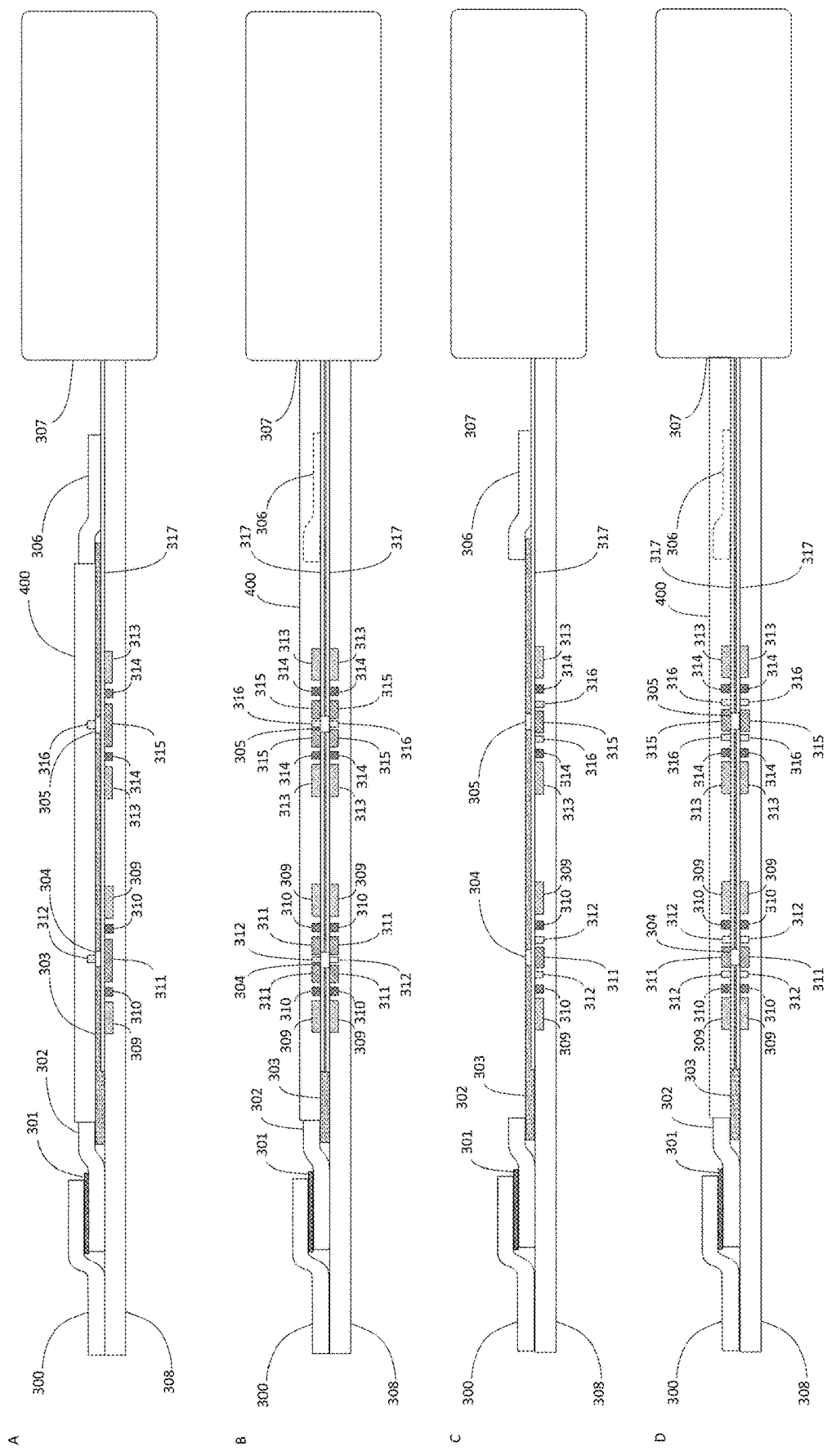
FIGS. 4A-4D show a schematic overview (side view) of a device suitable to perform a method according to the present invention arranged as lateral flow assay.

FIG. 3 B) shows a top view of an exemplary lateral flow assay. The substrate bottom 308 supports a sample pad 300, and a conjugation pad 302, separated by a filter membrane 301. A sample carrier strip 303 includes a detection area 304 and a control area 305. At the end a collection pad is arranged.

FIG. 3 C) shows a top view without the pads and the membrane revealing the underlying structures. Here one can see the arrangement of the electrodes, which are present twice, one set for the sample detection, one set for the control stripe. The test counter electrode 309 is located next to a test reference electrode 310 and followed by the test working electrode 311 (dissolution electrode). Next to it the test working electrode 312 (detection electrode) is located. The set for the control contains control counter electrode 313, control reference electrode 314, control working electrode (dissolution electrode) 315 and control working electrode (detection electrode) 316. FIG. 3 D) shows another top view without the pads, membranes and insulating layers revealing the underlying structures.

FIGS. 4A-4D show a schematic overview (side view) of alternative devices suitable to perform a method according to the present invention arranged as lateral flow assay and being an alternative design of the device shown in FIGS. 3A-3D. One difference is a substrate top 400 containing the test working electrode 312 (detection electrode).

Figure 5:
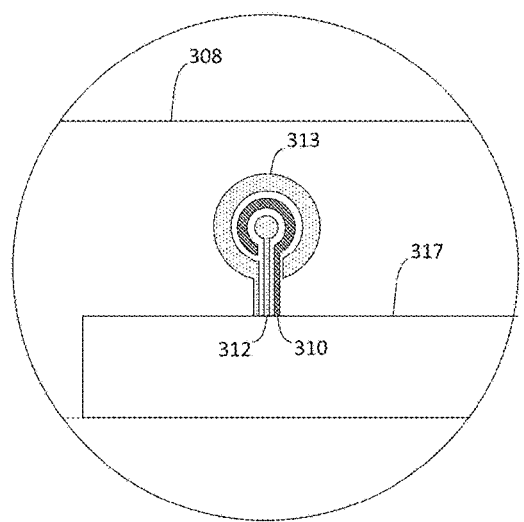
FIG. 5 shows a top view of an alternative electrode design for the device shown in FIGS. 3A-3D.

FIG. 5 shows an alternative electrode design, wherein a control counter electrode 313 and a test reference electrode 310 are arranged concentric around the test working electrode 312 (detection electrode).

Figure 6:
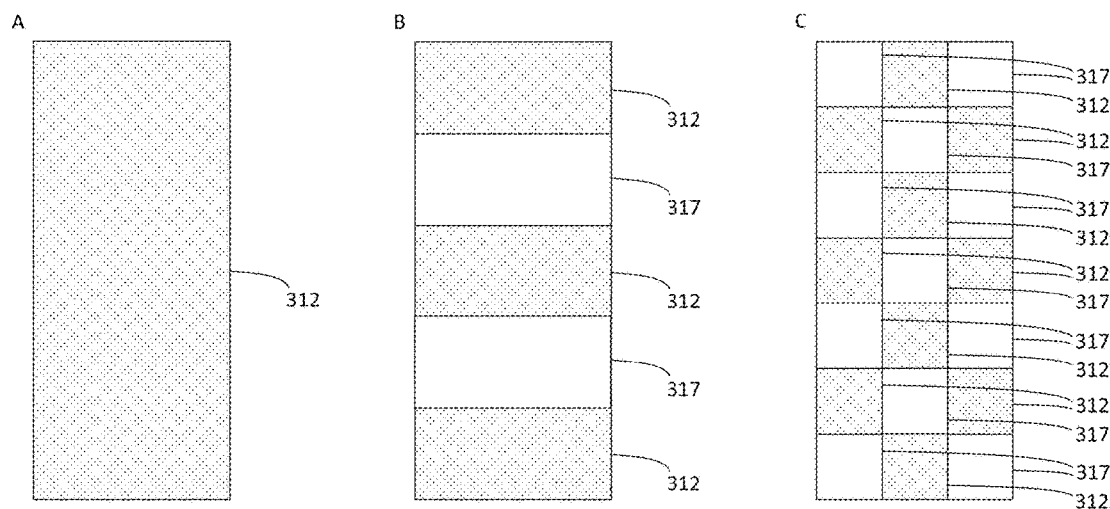
FIGS. 6A-6C show a top view of another alternative electrode design for the device shown in FIGS. 3A-3D.

FIGS. 6A-6C show alternative designs for the detection electrode suitable for devices according to the present invention. The detection electrode 312 may be one area or may be separated to several areas by insulators 317.

Figure 7:
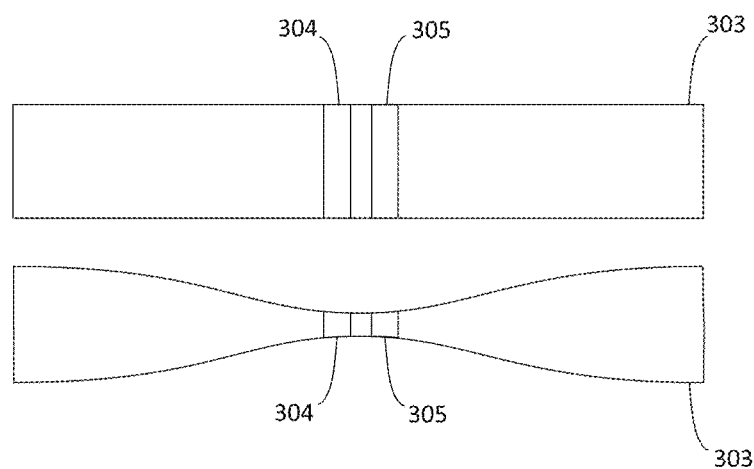
FIG. 7 shows a top view of alternative designs for the membrane shape of the device shown in FIGS. 3A-3D.

FIG. 7 shows a top view of alternative designs for the membrane shape of the device shown in FIGS. 3A-3D or FIGS. 4A-4D. The thickness of the membrane may decrease to the middle where the detection area 304 and the control area 305 are located (concentration of the analyte solution).

Figure 8:
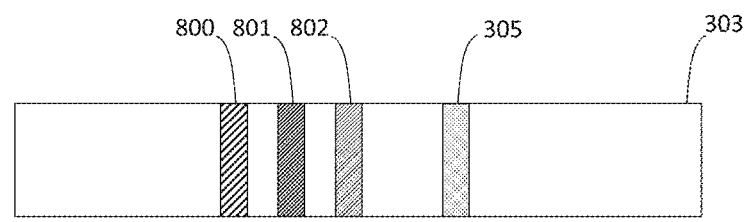
FIGS. 8A-8B show an exemplary design of an assay suitable including multiple detection areas configuring for a different target concentration range.
Figure 8:
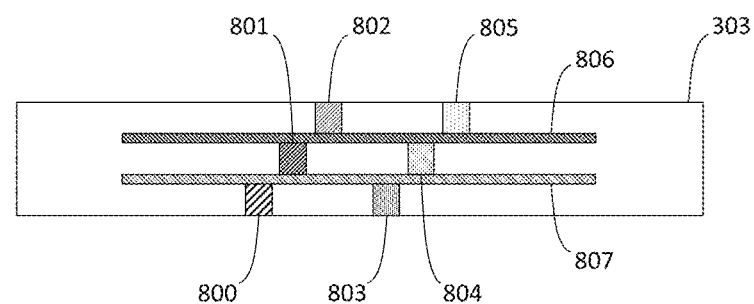

FIGS. 8A-8B show an exemplary design of an assay suitable including multiple detection areas configuring for a different target concentration range for an increased overall dynamic range or for an improved quantification accuracy or for multiplexed quantification of different molecules. Different detection areas (800, 801, 802) can be located on the sample carrier strip 303 one after the other and being followed by one control area 305, as shown in FIG. 8A. Alternatively, the sample carrier strip 303 may be separated by multi-channel barriers 806, 807 into different channels (e.g. located in parallel) wherein each channel contains one each detection area (800, 801, 802) and one control area (803, 804, 805). It is preferred that the individual detection areas (800, 801, 802) and control areas (803, 804, 805) show a staggered arrangement.

Figure 9A:
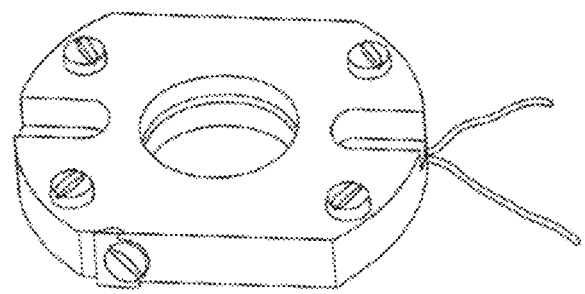
FIGS. 9A-9B show the device used to acquire the measurements shown in FIGS. 10A-14B.
Figure 9B:
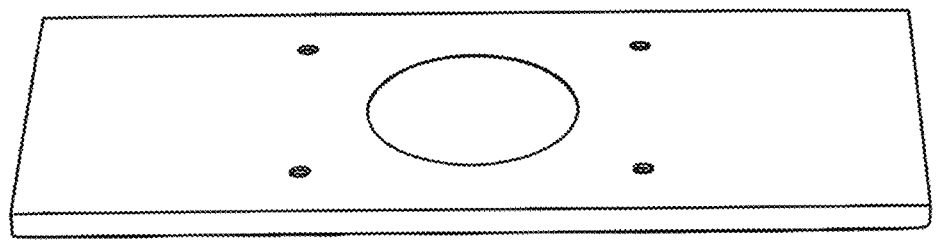

FIG. 9A shows a setup used for proof of concept experiments. Indium tin oxide coated microscopy slides (shown in FIG. 9B) were coated with bovine serum albumin and subsequently coated with gold nanoparticle (40 nm). The slides were further mounted in a flow cell providing an open well that allows in situ imaging using dark field microscopy).

Figure 10:
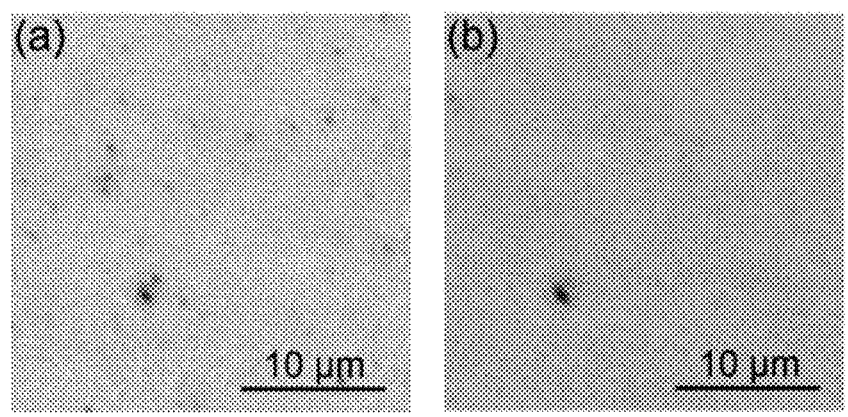
FIGS. 10A-10B show light microscopy images of gold nanoparticles on a transparent indium tin oxide electrode insulated by a layer of bovine serum albumin showing the successful etching of the electrically insulated particles.
Figure 11:
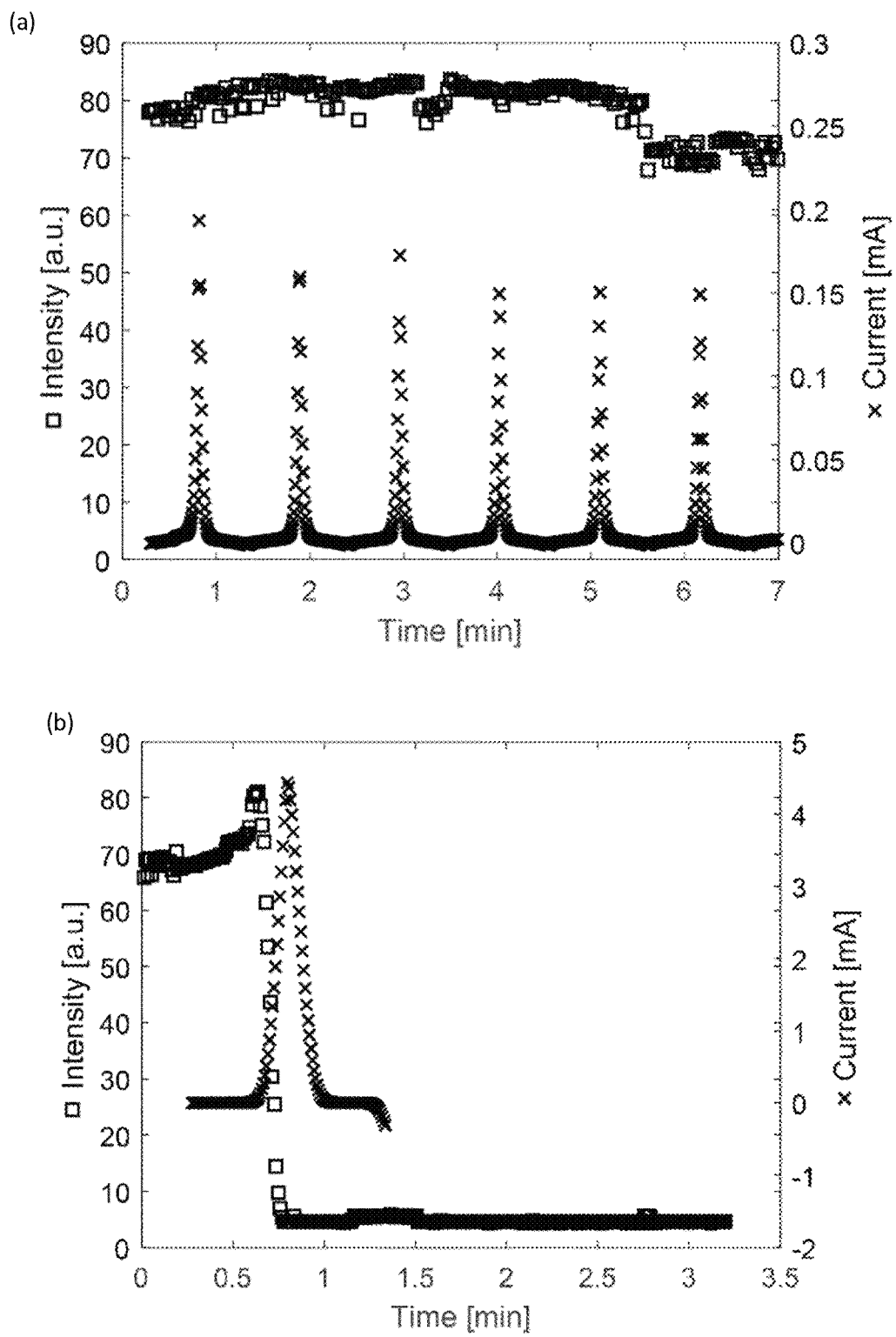
FIGS. 11A-11B show in a plot experimental results of the setup as in FIGS. 9A-9B. The particle scattering intensity is plotted against time with applied potential cycles with and without potassium iodide in solution.
Figure 12:
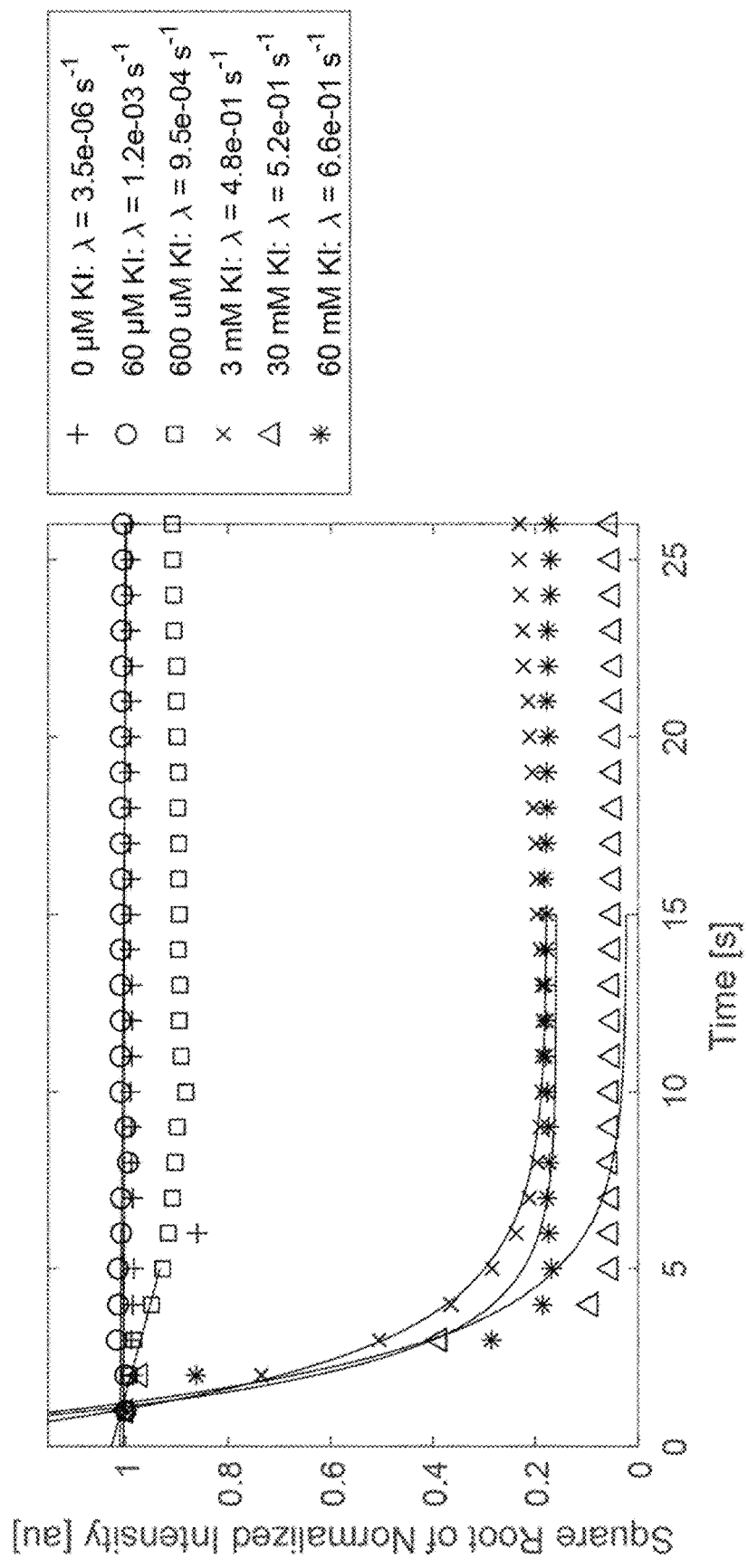
FIG. 12 shows in a plot experimental results of the setup as in FIGS. 9A-9B, with a constant potential applied and varying amount of potassium iodide.
Figure 13:
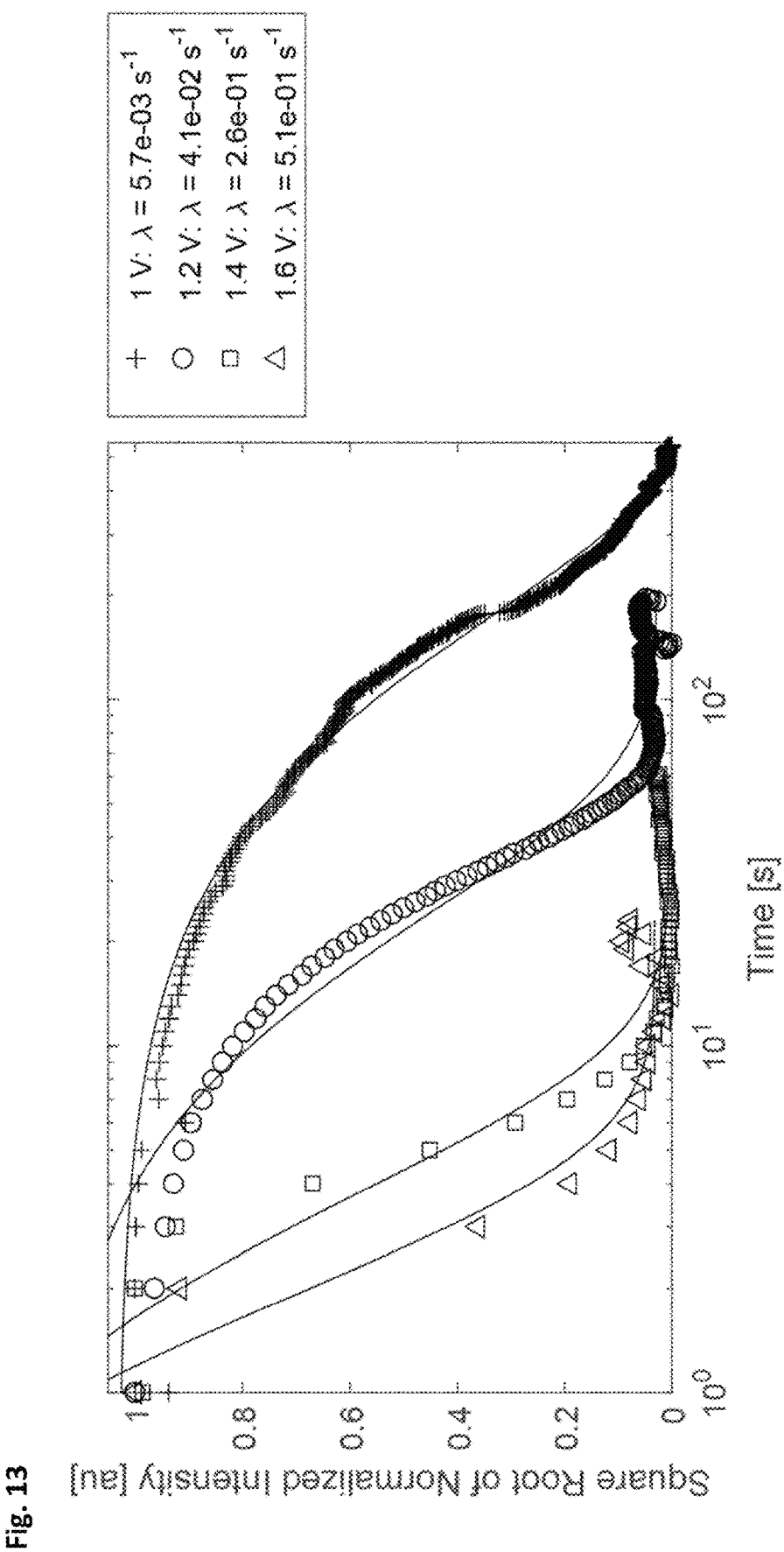
FIG. 13 shows in a plot experimental results of the setup as in FIGS. 9A-9B, with a constant amount of potassium iodide and varying applied potential.

After addition of a 150 mM NaCl solution, the gold nanoparticles show a constant intensity while applying 6 cycles of cyclic voltammetry from −0.2 to 1.4 V (see FIG. 10 (a) and FIG. 11 (a)). After adding a 3 mM solution of KI in 150 mM NaCl, the Au-nanoparticles remain unchanged before an electrochemical potential is applied, but they are etched very quickly while the applied potential reaches 1.2 V as illustrated in FIG. 10 (b) and FIG. 11 (b). The same setup (FIG. 9A-9B) was used to measure the dissolution kinetics depending on the used amount of potassium iodide in FIG. 12, and on the applied overpotential in FIG. 13.

Figure 14A:
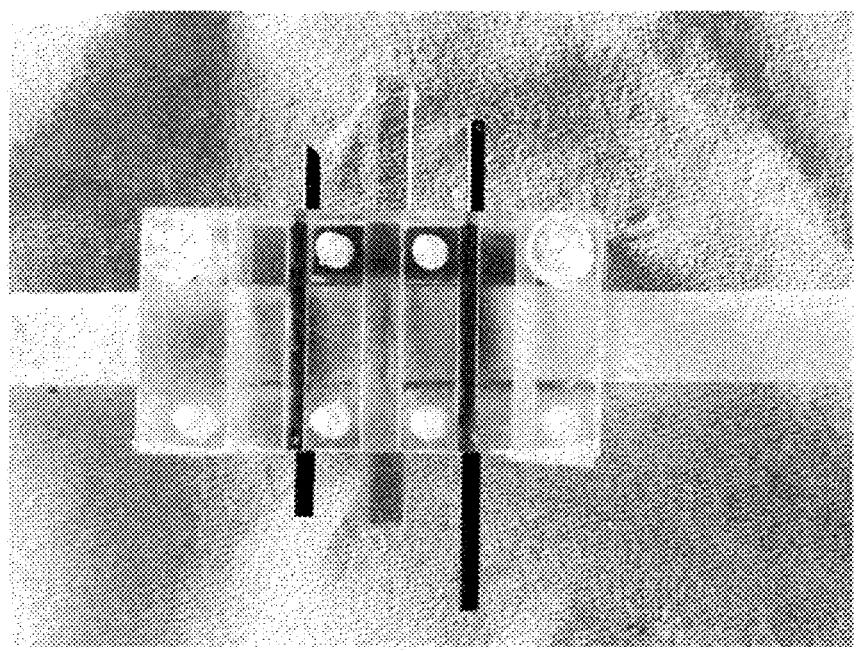
FIGS. 14A-14B illustrate a proof-of-concept experimental device for biosensing applications of the method according to the invention that was used to acquire the experimental measurements shown in FIGS. 15A-15B.
Figure 14B:
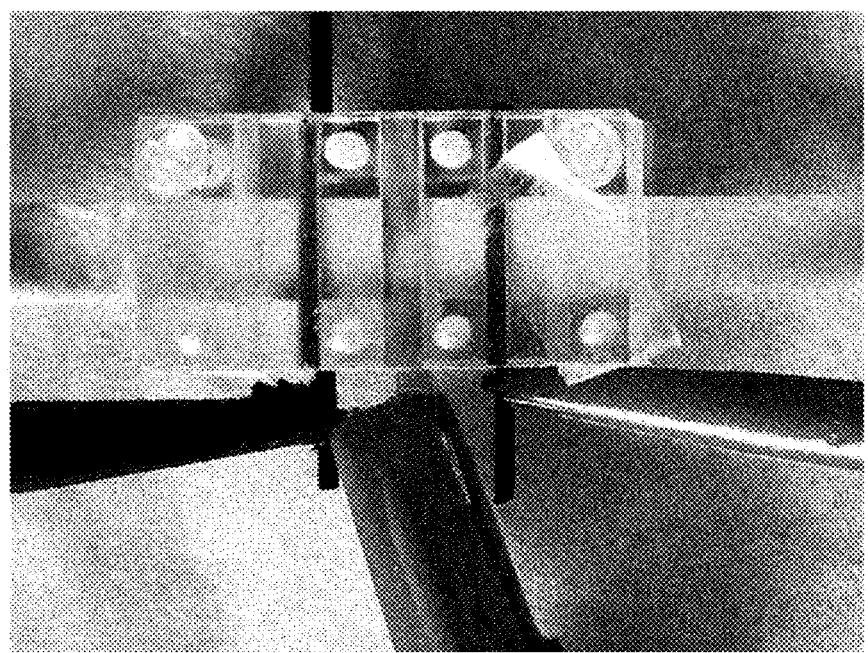
Figure 15:
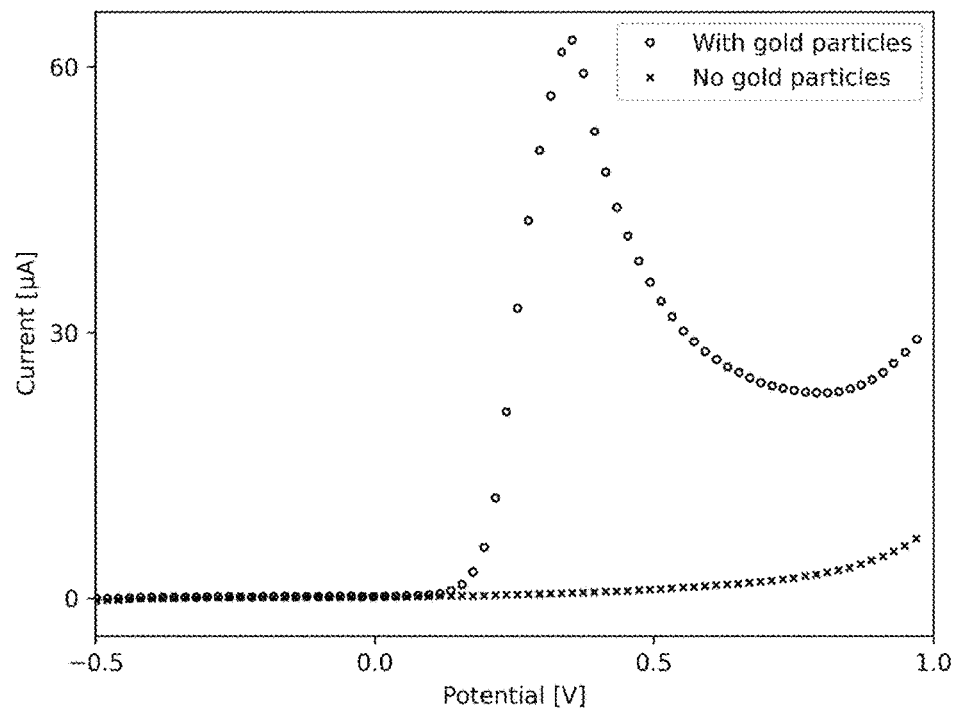
FIGS. 15A-15B show in a plot experimental results of the setup as in FIGS. 14A-14B, with the quantitative readout current after the dissolution of varying amounts of gold particles.
Figure 15:
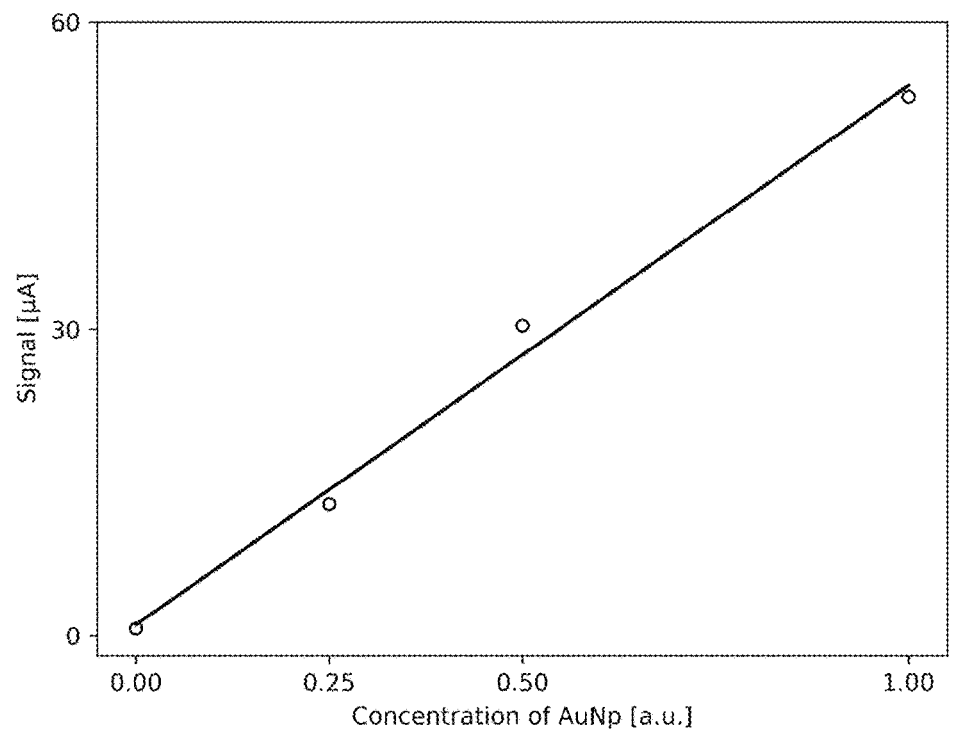

FIG. 14A-14B shows another setup used for a proof of concept experiment, namely a proof-of-concept embodiment of an electrochemical lateral flow assay with a three electrodes setup and a lateral flow assay strip. A line of adsorbed gold nanoparticles was added to said strip and is shown in FIG. 14A. The same setup after the electrochemical dissolution of the gold nanoparticles is illustrated in FIG. 14 B. The gold nanoparticles were functionalized with biotin and the detection/quantification line is functionalized with streptavidin, which specifically binds the biotin on the gold nanoparticles. The corresponding readout current using cyclic voltammetry of the test strip described above is shown in FIG. 15 (a), after the dissolution of the gold nanoparticles (circles) and a control experiment without gold nanoparticles (crosses). FIG. 15 (b) shows the linear response of the peak currents of a dilution series of the gold nanoparticles.

What is claimed:

1. A molecular sensing method where analytes within a sample are detected or quantified using electrochemically controlled degradation of metals comprising the following steps:
   A) providing colloidal metal particles being conjugated to biomolecules having the ability to recognize and bind a specific analyte,
   A1) allowing binding of the biomolecules to the specific analyte,
   B) contacting the colloidal metal particles being conjugated to biomolecules with a solution not degrading the colloidal metal particles and containing iodide as an inactive precursor which remains inactive until step C,
   C) applying an electrochemical potential to the solution containing the inactive precursor via electrodes converting the iodide into iodine and triiodide and thereby generating a solution that degrades the metal particles,
   D) detecting or quantifying electrically or electrochemically the degraded colloidal metal particles which allows detection or quantification of the specific analyte,
   wherein a sequence of steps A), A1), and B) may be changed or may take place simultaneously.

2. The method according to claim 1, wherein at least two electrodes are used for the application of the electrochemical potential for electrochemical generation of the solution that degrades the metals.

3. The method according to claim 1, wherein the colloidal metal particles are adsorbed on or in a substrate and wherein the substrate is a non-conductive substrate or a conductive substrate with a non-conductive coating.

4. The method according to claim 1, wherein a detection electrode is made of indium tin oxide.

5. The method according to claim 1, used to detect presence of the specific analyte and/or quantify the specific analyte within a lateral flow assay which may be operated as competitive or sandwich assay and/or used to simultaneously detect presence of multiple analytes in a single experiment.

6. The method according to claim 1, wherein step D) comprises plating of metal ions caused by degradation due to application of a plating potential to a detection electrode and subsequently determination of electric current caused by electrochemical dissolution of plated metal ions.

7. A molecular sensing device for electrochemically controlled degradation of colloidal metal particles for detection or quantification of analytes in solution, comprising:
   at least two electrodes,
   colloidal metal particles conjugated to biomolecules for recognizing and binding a specific analyte, and
   a solution containing iodide as an inactive precursor,
   wherein application of an electrochemical potential to the solution containing the inactive precursor iodide is suitable for generating a solution that degrades the colloidal metal particles conjugated to biomolecules into meal ions and the metal ions which are then electrically or electrochemically detected or quantified which allows quantification or detection of the specific analyte.

8. The device according to claim 7, comprising three electrodes, wherein a first and second of said three electrodes are suitable for application of an electrochemical potential for electrochemical generation of a solution that degrades metals and a third of said three electrodes is a reference or control electrode, or
   comprising at least four electrodes, wherein said at least four electrodes comprise at least two working electrodes, one counter electrode and one reference or control electrode, or
   comprising at least two sets of electrodes, wherein each set of electrodes comprises at least one detection electrode, at least one dissolution electrode, at least one counter electrode, and at least one reference electrode.

9. The device according to claim 7, wherein the colloidal metal particles are adsorbed on or in a substrate and wherein the substrate is a non-conductive substrate.

10. The device according to claim 7, comprising at least one detection electrode made of indium tin oxide.

11. The device according to claim 7, containing electrodes for detection of the dissolved metal being different than the electrodes for application of the electrochemical potential for the electrochemical generation of a solution that degrades metals and/or containing several electrodes for detection of the dissolved metal arranged within several detection areas, wherein each detection area refers to a single analyte or to a specific analyte concentration.

12. A molecular sensing device containing at least two electrodes, including a working electrode made of indium tin oxide, for quantification or detection of gold nanoparticles conjugated to a biomolecule for recognizing and binding a specific analyte wherein the method for quantification comprises the following steps:
   a. degradation of the gold nanoparticles conjugated to a biomolecule,
   b. quantifying an amount of degraded gold with anodic stripping voltammetry on the indium tin oxide working electrode, wherein the degradation and quantification are performed in presence of iodide, wherein quantification of the amount of degraded gold allows for quantification of the specific analyte which binds the conjugated biomolecule.

13. A method for quantification of gold nanoparticles conjugated to a biomolecule comprising the following steps:

binding of a biomolecule being conjugated to the gold nanoparticles to an analyte, degradation of gold nanoparticles conjugated to the biomolecule, and bound to the analyte, quantifying an amount of degraded gold with anodic stripping voltammetry on an indium tin oxide working electrode, wherein the degradation and quantification are performed in presence of iodide and wherein quantification of the amount of degraded gold allows for quantification of a specific analyte which binds to the conjugated biomolecule.

14. The method according to claim 13, including a washing step, where unbound analyte molecules and or unbound metal particles are washed away which are therefore not degraded and not quantified.

15. A system for quantification or detection of a specific analyte comprising:

A) a kit for the electrochemically controlled degradation of metals, and

B) an electronic device for applying and controlling a potential or current and for determination of an electric current or potential;

wherein the kit comprises:

a setup for a bioassay which may be an assay chamber, colloidal gold particles being conjugated to a biomolecule for recognizing and binding the specific analyte, an inactive precursor being iodide, and at least two electrodes which can be contacted to the electronic device for the application of an electrochemical potential or current which converts the inactive precursor being iodide to an active substance being iodine or triiodide being able to degrade or etch the colloidal gold particles.

16. A system according to claim 15 wherein the kit comprises at least one electrode made of indium tin oxide which may be involved in generating the iodine or triiodide for degradation of the colloidal gold particle or may be an additional detection electrode which can be contacted to the device for quantification of the amount of degraded metal with anodic stripping voltammetry which allows for quantification or detection of a specific analyte which binds to the conjugated biomolecule.

* * * * *